(No Model.)
D. N. HURD.
CIRCULAR SAW.
No. 384,979. Patented June 26, 1888.
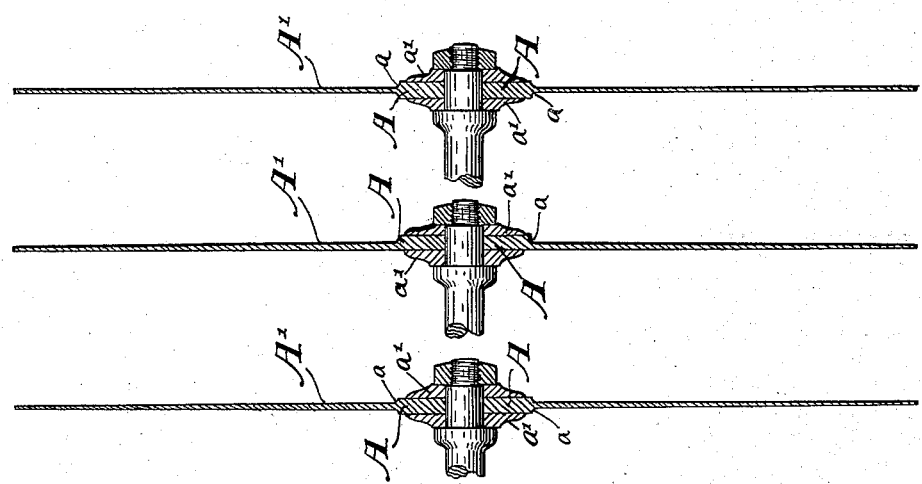
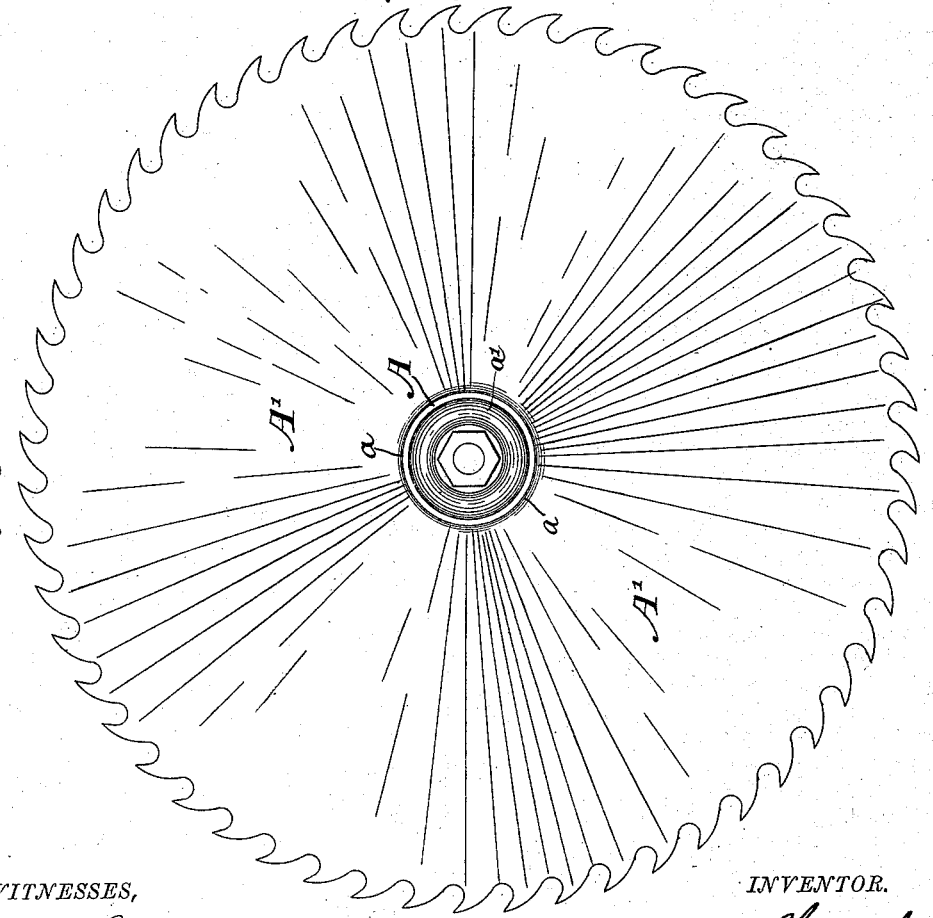
WITNESSES,
Chas. N. Leonard.
E. W. Bradford.
INVENTOR.
Dexter N. Hurd,
PER
C. Bradford,
ATTORNEY.
N. PETERS, Photo-Lithographer, Washington, D. C.

UNITED STATES PATENT OFFICE.

DEXTER N. HURD, OF KOKOMO, INDIANA.

CIRCULAR SAW.

SPECIFICATION forming part of Letters Patent No. 384,979, dated June 26, 1888.

Application filed April 6, 1887. Serial No. 233,826. (No model.)

*To all whom it may concern:*

Be it known that I, DEXTER N. HURD, of the city of Kokomo, county of Howard, and State of Indiana, have invented certain new and useful Improvements in Circular Saws, of which the following is a specification.

As is well known to those familiar with the art, it has been common to form circular saws thicker at the central portion than at the edge and taper them regularly from the center to the periphery, (this construction being thought necessary to give the saw the requisite stiffness for the work,) which renders it necessary that the teeth have a wide set in order to prevent binding and excessive friction while in use. I have discovered by experiment that much of this thick portion of the saw can be formed considerably thinner, and a great advantage in the art of sawing with this class of saws be thereby secured.

My said invention consists, therefore, in the construction of a circular saw in which that portion which passes through the wood in operation shall be of substantially equal thickness and have substantially parallel sides, the thick or stiffening portion of the saw being formed at its center within that circle which does not usually enter the wood, the remainder being of substantially equal thickness, although it may, and preferably does, vary to some extent, usually one or two "gages," as will be hereinafter more particularly set forth.

Referring to the accompanying drawings, which are made a part hereof, and on which similar letters of reference indicate similar parts, Figure 1 is a side elevation of a saw embodying my said invention; Fig. 2, a central vertical section through the same, and Figs. 3 and 4 views showing modifications in the construction.

In said drawings the portions marked A represent the thick central portion of the saw, and A' the portion from said thick portion to the periphery or edge. Said saw is formed at its center A of substantially the ordinary thickness; but instead of being regularly tapered from said center to the edge it is formed of even thickness to that point from its center, which includes the portion which does not pass through the wood, and there has an abrupt and substantially square shoulder, *a*, reducing the thickness of the saw to within one or two gages of the thickness it is formed at the edge, and from said shoulder to said edge is thus formed of substantially equal thickness, the slight taper of one or two gages being all that is required to give this saw the required stiffness. By this construction a saw is provided which will carry a much narrower set, and at the same time do its work with less binding and friction, and thus avoid the expenditure of a great portion of the motive power usually employed in driving such saws, as well as materially reduce the amount of lumber wasted in sawdust. Said thick portion of the saw is not intended to take the place of the flanges or collars *a'* for securing the saw to its mandrel or stiffening it in its center, as said flanges are of the same service to a saw constructed in this manner as they are to a saw tapered from its center to its periphery, in the usual manner.

In Fig. 3 I have shown a saw wherein the thick central portion is formed wholly on one side, the opposite side being formed perfectly flat, and in Fig. 4 I have shown a saw with the portion from the thick center to its periphery formed of exactly the same thickness, the sides being perfectly parallel.

I am aware that circular saws of various kinds have been provided with flanges and central plates bolted or riveted thereto, and am aware that shingle-saws have been formed with a thick central portion tapered gradually to a thinner edge. I therefore do not desire to be understood as claiming a saw with a thick center, broadly, but limit myself to the particular construction herein shown and described.

Having thus fully described my said invention, what I claim as new, and desire to secure by Letters Patent, is—

1. A circular saw formed with an abrupt or substantially square shoulder at that distance from its center which will include that portion which does not enter the wood and of substantially parallel sides from said shoulder to its periphery, substantially as herein shown and described.

2. A circular saw formed with a thick central portion, the edge of which forms an abrupt shoulder in the saw-blade, and from said shoulder to its periphery being formed of parallel or substantially parallel sides, substantially as herein shown and described.

3. A circular saw formed with a thick central portion, an abrupt shoulder at the edge of said thick portion, and a thinner portion from said shoulder to the edge of the saw, substantially as set forth.

In witness whereof I have hereunto set my hand and seal, at Indianapolis, Indiana, this 30th day of March, A. D. 1887.

DEXTER N. HURD. [L. S.]

In presence of—
   E. C. ATKINS,
   E. W. BRADFORD.